United States Patent
Smith et al.

(10) Patent No.: US 9,075,617 B2
(45) Date of Patent: Jul. 7, 2015

(54) EXTERNAL AGENT INTERFACE

(76) Inventors: Lindsay Ian Smith, Wellington (NZ); Michael Brian Gannon, Wellington (NZ); John Matthew Martin, Wellington (NZ)

( * ) Notice: Subject to any disclaimer, the term of this patent is extended or adjusted under 35 U.S.C. 154(b) by 464 days.

(21) Appl. No.: 13/376,180

(22) PCT Filed: Jun. 21, 2010

(86) PCT No.: PCT/NZ2010/000116
§ 371 (c)(1),
(2), (4) Date: Dec. 3, 2011

(87) PCT Pub. No.: WO2010/147488
PCT Pub. Date: Dec. 23, 2010

(65) Prior Publication Data
US 2012/0096066 A1     Apr. 19, 2012

Related U.S. Application Data

(60) Provisional application No. 61/218,417, filed on Jun. 19, 2009.

(51) Int. Cl.
*G06F 15/16*     (2006.01)
*G06F 9/44*      (2006.01)
*H04L 12/24*     (2006.01)
*H04L 29/08*     (2006.01)

(52) U.S. Cl.
CPC .............. *G06F 8/38* (2013.01); *H04L 41/044* (2013.01); *H04L 41/0813* (2013.01); *H04L 67/10* (2013.01)

(58) Field of Classification Search
CPC ................ H04L 41/046; H04L 41/044; H04L 41/0813; H04L 67/10
USPC .......................................................... 709/202
See application file for complete search history.

(56) References Cited

U.S. PATENT DOCUMENTS

| | | | |
|---|---|---|---|
| 5,608,720 A  * | 3/1997 | Biegel et al. .................. | 370/249 |
| 7,321,566 B2 * | 1/2008 | Fu .................................. | 370/254 |
| 7,698,351 B1 * | 4/2010 | Hing et al. ..................... | 707/827 |
| 8,037,164 B2 * | 10/2011 | Draca et al. .................... | 709/223 |
| 8,104,043 B2 * | 1/2012 | Padisetty et al. .............. | 718/106 |
| 8,229,587 B2 * | 7/2012 | Shieh et al. .................... | 700/112 |
| 8,514,725 B2 * | 8/2013 | Goerge et al. ................. | 370/242 |
| 2002/0174207 A1* | 11/2002 | Battou .......................... | 709/223 |
| 2004/0030819 A1* | 2/2004 | Williams ....................... | 710/260 |
| 2004/0036721 A1* | 2/2004 | Anderson et al. ............. | 345/848 |
| 2004/0044755 A1* | 3/2004 | Chipman ....................... | 709/223 |
| 2005/0278692 A1* | 12/2005 | Sridhar et al. ................. | 717/106 |
| 2009/0083400 A1* | 3/2009 | Draca et al. .................... | 709/220 |
| 2010/0036860 A1* | 2/2010 | Hiura et al. .................... | 707/101 |
| 2010/0228849 A1* | 9/2010 | Moore et al. .................. | 709/224 |

* cited by examiner

*Primary Examiner* — Richard G Keehn
(74) *Attorney, Agent, or Firm* — Bio Intellectual Property Services LLC (Bio IPS):; O. (Sam) Zaghmout (57) ABSTRACT

Establishing an external agent interface on an external agent interface platform. Defining, on an executing platform, a prepared element hierarchy on an executing platform as a function of at least an execution state of the executing platform. Transforming, on an executing platform, the defined prepared element hierarchy into an external agent interface element hierarchy as a function of at least the execution state. Exporting, from the executing platform, the external agent interface element hierarchy to an external agent interface platform.

12 Claims, 7 Drawing Sheets

EXTERNAL AGENT INTERFACE

CROSS REFERENCE TO RELATED APPLICATIONS

This application is a continuation of International Patent Application No. PCT/NZ2010/000116, filed on Jun. 21, 2010, which claims the benefit of U.S. Provisional Application No. 61/218,417 entitled "EXTERNAL AGENT INTERFACE", filed Jun. 19, 2009. The entire disclosure of these prior applications are hereby incorporated by reference.

FIELD OF THE TECHNOLOGY

The technology disclosed herein relates to software interfaces to external agents. More specifically, the technology relates to the interface definition, interface realization, and interface operation. Exemplary implementations of the technology are presented in the context of a client-server architecture.

SUMMARY

In some implementations, the technology can be a computer-implemented method, a system, and a computer program product for establishing an external agent interface on an external agent interface platform. In those implementations, the technology defines, on an executing platform, a prepared element hierarchy as a function of at least an execution state of the executing platform. Those implementations transform, on the executing platform, the defined prepared element hierarchy into an external agent interface element hierarchy as a function of at least the execution state. Those implementations further export, from the executing platform, the external agent interface element hierarchy to an external agent interface platform.

In some implementations the external agent interface hierarchy includes at least one data element, and at least one entity element, wherein each entity element accesses data only through at least one data element. In further such implementations, the data elements and the entity elements are related in a hierarchy, each entity element has at least one data element through which the each entity element can access as an ancestor, and access of a given entity element to data is only through at least the nearest ancestor data element of the given entity element.

In some implementations the technology further assigns an identifier to the combination of exported external agent interface element hierarchy, and the execution state from which the exported external used in transforming the prepared element hierarchy into the exported external agent interface element hierarchy. In further such implementations, the technology realizes an external agent interface on the external agent interface platform based at least in part on the exported external agent interface element hierarch; and upon communication from the realized external agent interface to the executing platform, communicates the assigned identifier to the executing platform and on the execution platform assign an identifier to the combination of the exported external agent interface element hierarchy, and the current execution state.

DETAILED DESCRIPTION

Reference will now be made in detail to implementations of the technology. Each example is provided by way of explanation of the technology only, not as a limitation of the technology. It will be apparent to those skilled in the art that various modifications and variations can be made in the present technology. For instance, features described as part of one implementation of the technology can be used on another implementation to yield a still further implementation. Thus, it is intended that the present technology cover such modifications and variations that come within the scope of the technology.

In many process execution systems, an external agent is involved that participates in the process, by receiving information and controlling execution. An external agent may be any entity or process outside of the executing system that may interact with the system. An external agent may be a human, or may be some computer controller system, or any other entity outside the control of the executing system. The executing process typically generates some kind of representation for the external agent to perceive and to interact with. This representation may be visual in nature, comprising visual elements such as images or text, or may contain behavioral elements such as executable code that responds to user input. The representation may be some non-visual means of allowing external agent interaction, such as a binary interface. In this case the elements that comprise the interface may form the mechanisms by which an external agent interacts with the system. This representation provided to external agents is known as an EA Interface.

A web page is an example of an EA Interface that may be used to represent data from an executing process and elicit feedback from the human agents perceiving that web page. Another example is the Graphical User Interface created by an executing program on a computer. In these types of applications the designer of the process designs the EA Interface prior to the execution of the process that realizes that interface. The manner in which the EA Interface is designed depends on the implementation platform for that EA Interface. In the case of a web page, the design may be the HTML and JavaScript code that are interpreted by the browser to render the page. In the case of binary interfaces, the design may be the structure and parameters of the allowable operations.

The present technology discloses an EA Interface in terms of a hierarchy of Prepared Elements that form a tree structure. A tree structure is a natural way to describe EA Interfaces due to their hierarchical nature where some items are contained within others.

Many systems exist for the execution of computer-implemented processes (i.e., software). In computing, "platform" can describe the hardware architecture and software framework that allows software to run. Typical platforms include a computer's architecture, operating system, programming languages, and related libraries. Typically software execution is initiated and/or affected by an external agent (EA). Examples of external agents include users, sensors, and other computer processes. Examples of how these agents interact with software execution include a user connecting to the software via a graphical user interface (GUI), and another computer-implemented process communicating with the first computer-implemented process via application programming interface (API) or an application binary interface (ABI). APIs, GUIs, ABIs are examples of EA Interfaces.

In many applications, e.g., web-based applications, the software primarily runs on one platform (a server as an Executing Platform), while the EA interacts via an EA Interface on another platform (a client as an EA Interface Platform running in an internet browser remote from the Executing Platform). In other applications, the Executing Platform and the EA Interface Platform can be the same platform.

EA Interfaces are typically defined using a description in the context of the EA Interface Platform. Such a definition is tailored for the EA Interface Platform rather than for the problem domain that the software is designed for. When developing the interface to be implemented on an EA Interface Platform, the application developer typically must add all the behavioral logic to that implementation in order to carry out the tasks required of the EA Interface. As the complexity of the EA Interface increases, so does the burden on the application developer to ensure errors do not occur and that data and behavior can be effectively organized on the EA Interface Platform.

Figure 1:
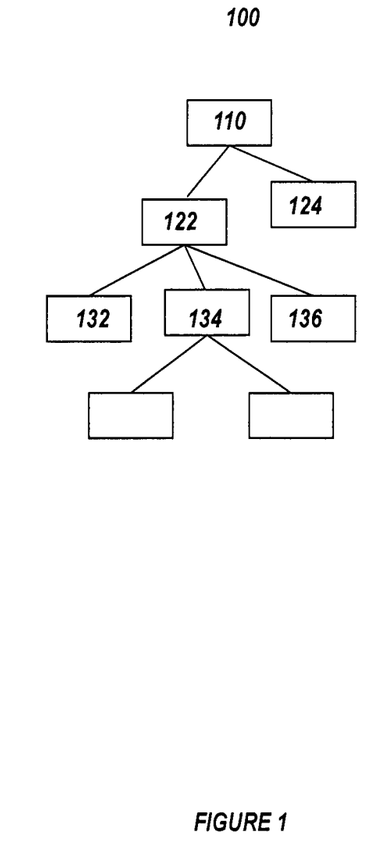
FIG. 1 illustrates a Prepared Elements Hierarchy of the present technology that can form the description of an External Agent Interface of the present technology.

In systems where the Executing Platform is separate from the EA Interface Platform, the definition of the EA Interface is typically sent to the EA Interface Platform in response to process execution and then is not tracked by the Executing Process. This disconnected approach means that further communication with the Executing Platform by the realized EA Interface may not be interpreted in the context of the process that provided the interface. The ability to record the history of a single agent's interaction with the Executing Platform is lost. Additionally when further execution is initiated by the EA Interface, the Executing Platform does not necessarily have knowledge of the structure of the interface that requested it.

Where the term 'Prepared Element' is used in this specification it means an object that represents a description of some aspect of an EA Interface. In implementations of the technology, a set of Prepared Elements forms a description of the EA Interface and can be arranged hierarchically in a tree structure. FIG. 1 illustrates the Prepared Elements Hierarchy 100 that can form the description of an EA Interface. The illustrated hierarchy has a hierarch 110 that has two children 122 and 124. Node 122 has three children, i.e., 132, 134, and 136. The Prepared Elements can be used, e.g., in the Executing Platform, to define an EA Interface that can be transformed into an EA Interface Hierarchy.

The construction of the Prepared Element Hierarchy can proceed in a number of ways. The application developer may explicitly build the hierarchy programmatically, or there can be an automated process for turning a text-based description of the interface into the corresponding Prepared Element Hierarchy. Each Prepared Element can represent an entity in the description of the EA Interface. In a graphical interface, a Prepared Element can correspond to a visual aspect of the EA Interface such as an image or a button, or it can represent some non-visual aspect of the EA Interface such as the code to implement a behavior in the EA Interface. It can be a combination of two, for example in the case of a button there is both a visual component (the way the button looks) and a non-visual component (what to execute when the button is clicked). A Prepared Element can also contribute nothing to the final EA Interface, but instead implement a control mechanism that can be utilized during the transformation from Prepared Element Hierarchy to EA Interface Element Hierarchy. For example, a Prepared Element can have two child elements, and during the transformation phase can determine, based on Execution State, whether to include the transformative result of the first or second child in the resulting EA Interface Element Hierarchy.

The design of the Prepared Element can be such that it forms an interface that implementations must adhere to rather than specifying the implementation. This allows arbitrary implementations such as those described above to be implemented as per the needs of an application designed that uses the technology. The only operation mandated by the interface is the 'createInterfaceElement' operation that takes as a parameter the current Execution State.

As an example of defining an EA Interface in a Prepared Element Hierarchy 100, consider the following psuedocode. The psuedocode shows the definition of a Prepared Element as a function of Execution State, and returning an Interface Element.

```
interface PreparedElement
    // Create an Entity element given some Execution State
    function createInterfaceElement(ExecutionState
    executionState) returns InterfaceElement
    // return the children of this PreparedElement so we can
    traverse the tree
    function getChildren returns PreparedElement[ ]
end interface
```

Defining the interface using Prepared Elements can be achieved with the following exemplary definitions of Prepared Elements; representing in order, a visually grouped area, text, a button, and an input.

```
// Contains child Prepared Elements
    structure Group implements PreparedElement
        PreparedElement[ ] childElements
        constructor(PreparedElement[ ] children)
            childElements = children
        end constructor
    end structure
    structure Text implements PreparedElement
        String displayText
        constructor(String text)
            displayText = text
        end constructor
    end structure
    structure Button implements PreparedElement
        String buttonText
        constructor(String text)
            buttonText = text
        end constructor
    end structure
    structure Input implements PreparedElement
        String inputName
        constructor(String name)
            inputName = name
        end constructor
end structure
```

These Prepared Elements can be used to construct a particular interface by defining a declarative syntax such as XML e.g.:

```
<Group>
    <Text text="Enter your details"/>
    <Group>
        <Text text="Enter name:"/>
        <Input name="name"/>
        <Text text="Enter email:"/>
        <Input name="email"/>
        <Button text="Save"/>
    </Group>
</Group>
```

This can be transformed into the following to provide the final interface definition.

```
new Group([new Text("Enter your details"),
    new Group([new Text("Enter name:"),
        new Input("name"),
        new Text("Enter email:),
        new Input("email"),
        new Button("Save")])])
```

Figure 2:
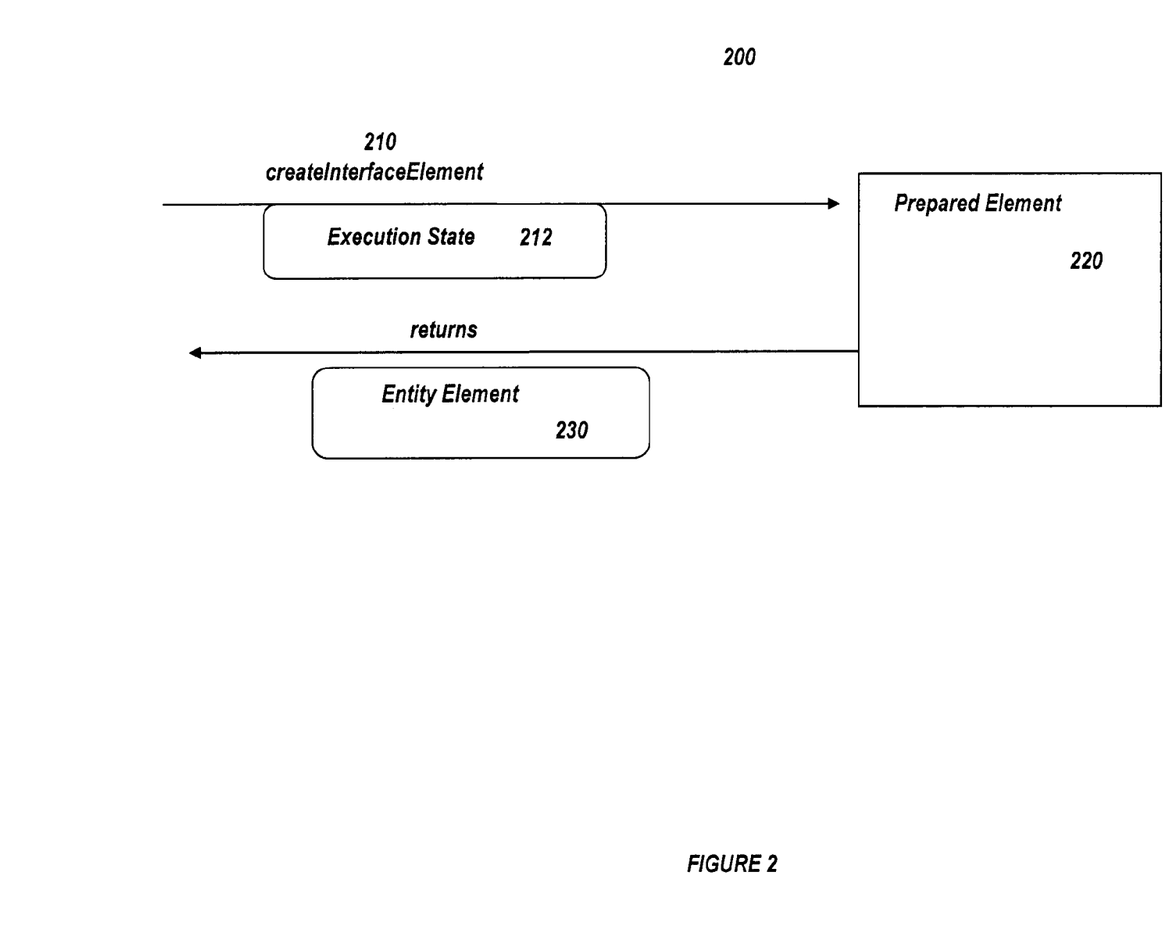
FIG. 2 illustrates methods of the technology for creating an Entity Element of an External Agent Interface Element Hierarchy.

Referring to FIG. 2, methods 200 of the technology are illustrated. In some implementations, when commanded 210 to create an EA Interface Element, a Prepared Element 220 is provided with data, e.g., an Execution State 212. The data supplied can comprise information from the executing process that requested the creation of the EA Interface Element or other information derivable or accessible to the Executing Platform. A Prepared Element can return a hierarchy of Interface Elements, including an EA Interface Hierarchy Entity Element 230. The returned hierarchy may be created by turning each of the Prepared Element's children into Interface Elements; and the Prepared Element can be defined not to return any Interface Elements. A Prepared Element can perform processing as part of the creation of an EA Interface Element not limited to tasks directly relating to creation of that EA Interface Element. When creating the EA Interface Element, a Prepared Element is supplied information regarding the nature of the EA Interface that it is creating the Interface Elements for.

Figure 3:
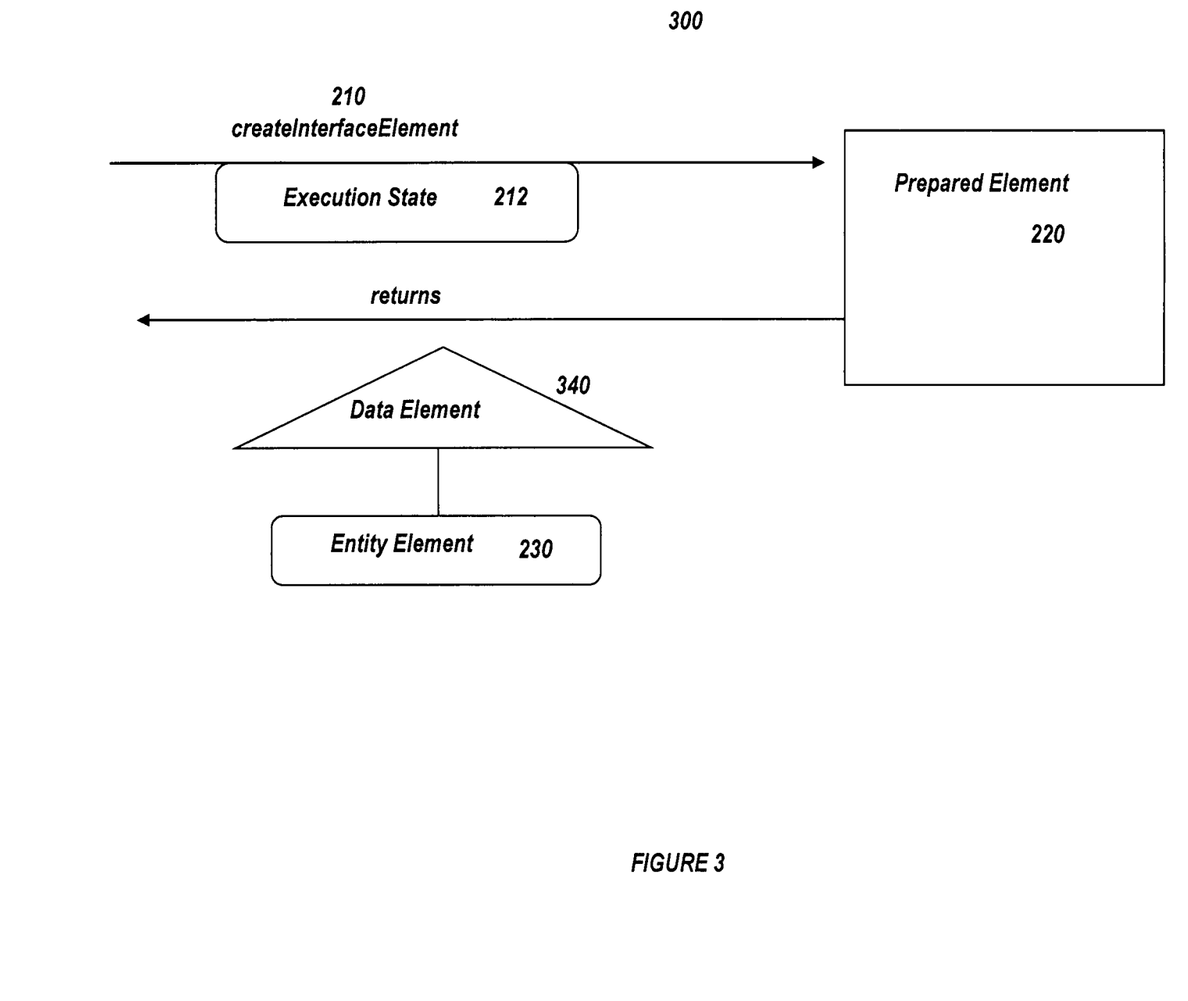
FIG. 3 illustrates methods of the technology for creating a Data Element and an Entity Element of an External Agent Interface Element Hierarchy.

Referring to FIG. 3, methods 300 of the technology are illustrated. In some implementations, when commanded 210 to create an EA Interface Element, a Prepared Element 220 is provided with data, e.g., an Execution State 212. The data supplied can comprise information from the executing process that requested the creation of the EA Interface Element or other information derivable or accessible to the Executing Platform. A Prepared Element can return a hierarchy of Interface Elements, including an EA Interface Hierarchy Entity Element 230 and an EA Interface Hierarchy Data Element 240.

For a given moment during an instance of process execution, Execution State is available that can include any information relating to or derived from process execution. Execution State can include data that is retrieved or calculated during process execution, information about the current process execution, or other data accessible on the Executing Platform. Examples of Execution State include the result of mathematical calculations, the results of queries made against external systems such as a database, information about the identity of the agent that initiated process execution, or information about the Executing Platform. Execution State can be specific to a particular occurrence of process execution.

While a Prepared Element Hierarchy can be created outside process execution, the EA Interface Element Hierarchy is preferably created during process execution by transforming the Prepared Element Hierarchy given the current Execution State. The 'createInterfaceElement' operation implemented by each Prepared Element can take the current Execution State as a parameter and can create an EA Interface Element. A Prepared Element is not limited to creating a single EA Interface Element during the transformation; the created EA Interface Element can have multiple children created by the same Prepared Element. Each Prepared Element can be responsible for creating the entire sub-tree of EA Interface Elements corresponding to the sub-tree of Prepared Elements rooted at that Prepared Element. A Prepared Element can implement this by returning a EA Interface Element that has as children the result of calling 'createInterfaceElement' on each of its child Prepared Elements. This recursive construction allows the Prepared Element to control whether its child Prepared Elements contribute to the EA Interface Element Hierarchy or not.

Figure 4:
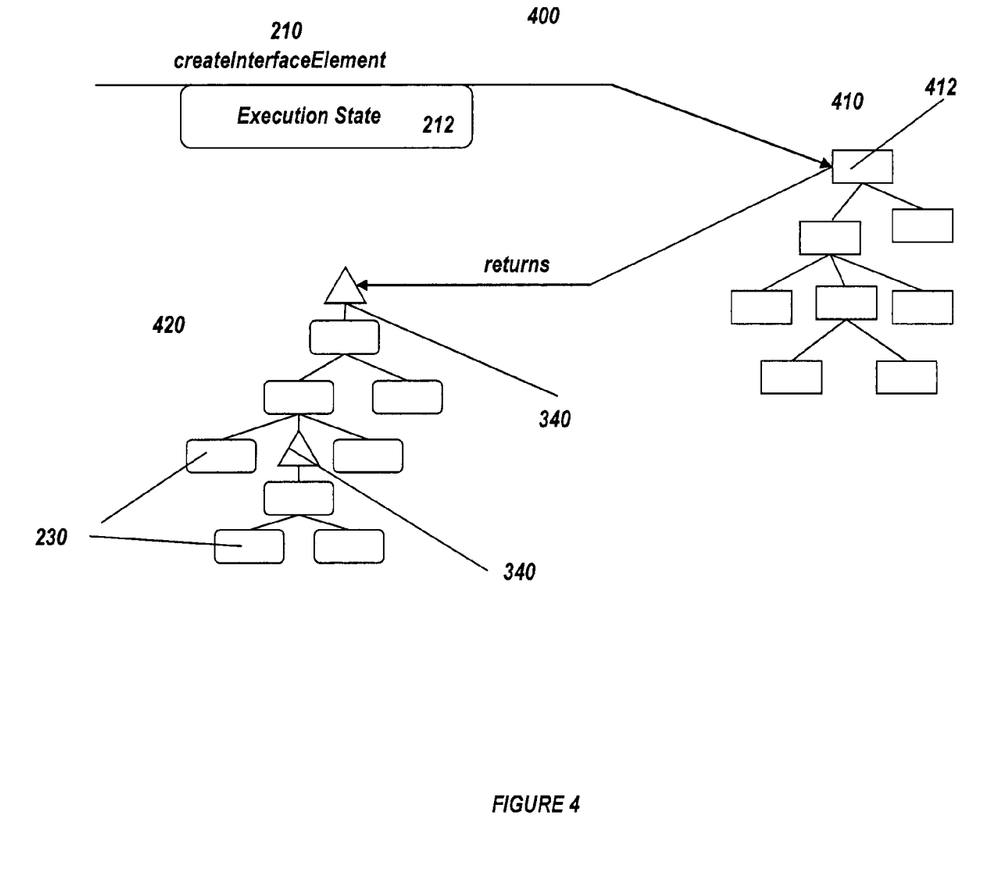
FIG. 4 illustrates methods of the technology for creating an External Agent Interface Element Hierarchy from a Prepared Element Hierarchy.

FIG. 4 illustrates methods 400 of the technology for transformation of a Prepared Element Hierarchy 410 to EA Interface Element Hierarchy 420 comprising Data Elements 340 and Interface Elements 230 in response to the create Interface Element command 210 carrying the Execution State as an argument 220. The root Prepared Element 412 has recursively called 'createInterfaceElement' on its children to form the tree.

As part of a the task of creating an EA Interface Element, a Prepared Element can perform process execution that is required of it, not limited to processing directly related to the creation of that element. For example, it can read or write data from some external system, or perform other process execution. For example, a Prepared Element of a graphical interface that corresponds to a window EA Interface Element can recurse on its child Prepared Elements to create the EA Interface Elements that appear inside the window in the final EA Interface. A Prepared Element can include the transformation of its child Prepared Elements only if some condition is met by the given Execution State. For example, this would enable part of the EA Interface to be omitted based on the external agent's security permissions.

An EA Interface Element may either be an Entity Element, or a Data Element. An Entity Element can correspond to some aspect of the final EA Interface. If the EA Interface is visual in nature, examples of such entities are images, text or user interface controls. Non-visual aspects of an interface can include executable code that controls or responds to EA interactions, and mechanisms that allow interaction by the EA. A Data Element is an element that can contain data, and can control access to data of Entity Elements in that Data Elements sub tree in the EA Interface Element Hierarchy. When a Prepared Element constructs a Data Element as part of the transformation, it can retrieve the data that will be contained by the Data Element. It can draw data from the current Execution State. It can retrieve data from external systems. It can initiate further process execution in order to calculate or generate the data it requires. It can also provide the means to retrieve or calculate that data when requested.

As an example, the 'create Interface Element' function 210 on the Prepared Element interface 220 can return the Interface Element (shown as 230 Entity Element) for that Prepared Element 210 for that interface. The Interface Element can be a separate structure representing the Prepared Element in that interface. The Interface Element can be an Entity Element or a Data Element as illustrated by the following pseudocode.

```
interface InterfaceElement
    // return the children of this InterfaceElement so we can
    traverse the tree
        function getChildren returns InterfaceElement[ ]
    end interface
// Specific types for the sub types
interface EntityElement extends InterfaceElement
end interface
interface DataElement extends InterfaceElement
end interface
```

In cases where the EA Interface Platform includes a web browser that interprets Hypertext Markup Language (HTML) and JavaScript, Prepared Elements can implement the functionality for creating the associated Interface Element as illustrated in the following pseudocode.

```
// Represents an input in the interface
structure Input implements PreparedElement
    String inputName
    constructor(String name)
        inputName = name
    end constructor
    function createInterfaceElement(ExecutionState state)
    returns InterfaceElement
        // assuming a browser, create an
InputInterfaceElement
        return new InputInterfaceElement(name)
    end function
end structure.
```

Prepared Elements with child elements can recursively call create Interface Element on children.

```
structure Group implements PreparedElement
    PreparedElement[ ] childElements
    constructor(PreparedElement[ ] children)
        childElements = children
    end constructor
    function createInterfaceElement(ExecutionState state)
        // assuming a browser, but we could check that first
if needed
        InterfaceElement[ ] children = new InterfaceElement[ ]
        for each childElement in childElements
        children.add(childElement.createInterfaceElement(state))
            next childElement
        return new GroupInterfaceElement(children)
    end function
end structure
```

Prepared Elements can inspect execution data, i.e., Execution State, to determine the nature of the Interface Elements to be created. In the following pseudocode example, the Prepared Element inspects the authorization of the current execution and the child element is only processed if certain authorization criteria are met.

```
structure CheckGroupMembershipWrapper implements PreparedElement
    String testGroup
    PreparedElement child
    constructor(String groupName, PreparedElement child)
        testGroup = groupName
        childElement = child
    end constructor
    function createInterfaceElement(ExecutionState state)
        // check that the current execution state is
authorized for the named groupd
        if
state.getSecuritySettings( ).isMemberOfGroup(testGroup)
            return child.createInterfaceElement(state)
```

```
        else
            // Don't allow that element to go to the
interface
            return null
        end if
    end function
end structure
```

In the next pseudocode example, the Prepared Element transforms its child list once for each row of data present in the Execution State:

```
structure Repeator implements PreparedElement
    String datasetName
    PreparedElement[ ] children
    constructor(String dataset, PreparedElement[ ] childList)
        datasetName = dataset
        children = childList
    end constructor
    function createInterfaceElement(ExecutionState state)
        // Find the referred dataset
        Dataset d = state.findDataset(datasetName)
        // Groups many InterfaceElements into a list under
one element
        InterfaceElement result = new ListInterfaceElement( )
        // For each row
        for i = 0 to d.getRowCount( ) step 1
            // So that children see this row as current
            d.setCurrentRow(i)
            // for each child
            for each child in children
        result.addElement(child.createInterfaceElement(state))
                next child
            end for
        return result
    end function
end structure
```

A created Interface Element may be an Entity Element as in the prior examples, or may be a Data Element. Data Elements augment or modify the visibility of data to Interface Elements that are their descendants. In the next pseudocode example a Prepared Element performs a query of an external system when being transformed into an Interface Element. The resulting data becomes available to child elements, and the result is a Data Element that contains this data.

```
structure ExternalQueryElement implements PreparedElement
    String query
    PreparedElement[ ] children
    constructor(String dataQuery,
            PreparedElement[ ] childElements)
        query = dataQuery
        children = childElements
    end constructor
    function createInterfaceElement(ExecutionState state)
    returns InterfaceElement
        // perform a query on some external system
        Dataset result = runQuery(query)
        // Modify the ExecutionState that is passed to the
children so that
        // the data can be accessed - take the existing and
add the result
        ExecutionState childExecutionState = new
ExecutionState(state, result)
        InterfaceElement[ ] childResults = new
IntefaceElement[ ]
        for each child in children
        childResults.add(child.createInterfaceElement(childExecutio
nState))
            next child
        // Returned element is a DataElement containing the
result of our query
```

-continued

```
        return new DatasetDataElement(result, childResults)
    end function
end structure
```

The system performing process execution can make the transformation of Prepared Element Hierarchy to EA Interface Element Hierarchy as part of process execution, when the interface is required.

```
... process is being executed ...
    PreparedElement preparedHierachy :=
retrievePreparedElementHierarchy("enter-details")
    // Create the Execution state
    ExecutionState executionState = createCurrentExecutionState( )
    // Create the interface entity hierachy - this call will result
in the recursive call
    // to each of the elements
    InterfaceElement interfaceHierarchy =
preparedHierarchy.createInterfaceElement(executionState)
    ... use the interface hierarchy ...
```

The Executing Platform is the system that executes the process that resulted in creating the EA Interface Element Hierarchy, for example a computer executing an application. The EA Interface Platform is the system that realizes and controls the EA Interface and provides mechanisms to allow interaction by an EA. A web browser is an example of an EA Interface Platform for visual interfaces. The Executing Platform and the EA Interface Platform can be part of the same system, or they may be physically different systems.

Once the EA Interface Element Hierarchy has been created on the Executing Platform, it can be exported to the EA Interface Platform so that it can be realized there. The manner in which the exporting is achieved can depend on the nature of the EA Interface Platform and the format of the information that it requires to render an EA Interface. For example, if the EA Interface Platform is a web browser, then the manner of exporting the EA Interface Element Hierarchy can be to translate the EA Interface Elements into the HTML and JavaScript that can implement the required visual and behavioral aspects in the browser. Other EA Interface Platform implementations can require the EA Interface Elements to be exported using whatever representation would be applicable for that platform.

An Interface Element (Data Element or Entity Element) can encapsulate the required information to realize that entity on the EA Interface Platform. This can include both the attributes of the Interface Element, and also environmental entities required to function correctly on the EA Interface Platform. For example, in the case of a web platform, the EA Interface Element may specify that certain JavaScript or CSS libraries are included on the page. These form environmental attributes because they are required for the definition of the Interface Element to be interpreted correctly.

In typical systems, the developer needs to manually determine all the requirements of the resulting EA Interface description and add them by hand. This makes re-use and componentization of EA Interface entities complicated and error prone. Implementations of the present technology enable the Interface Elements to specify the requirements for a given EA Interface Platform. This self-contained property can make the process of developing an EA Interface more productive because the developer need only specify the presence of an EA Interface entity in the initial description for that entity to be included and to function correctly within the EA Interface. This can promote a high level of re-use between External Agent Interface applications.

The Executing Platform, in the process of exporting the EA Interface Element Hierarchy, can provide the exported EA Interface Element Hierarchy with the information required to link the EA Interface Element Hierarchy on the EA Interface Platform with the EA Interface Element Hierarchy on the Executing Platform from which it was exported. The link can connect the realization of the EA Interface Element Hierarchy on the EA Interface Platform with the particular process execution instance that created it, along with information available in the Execution State or in the interface hierarchy. One possible implementation is for the Executing Platform to assign the particular EA Interface Element Hierarchy with a unique identifier and to store the interface hierarchy and Execution State on the Executing Platform against this identifier. The identifier can then be exported to the EA Interface Platform along with the EA Interface Element Hierarchy so that the EA Interface Platform can refer to this identifier in subsequent communications with the Executing Platform.

In typical EA Interface generating systems, once the EA Interface description has been exported to an EA Interface Platform, the Executing Platform keeps no explicit record about the particular execution instance that created it. If data that existed during the process execution is to be persisted, it must be exported with the EA Interface description. Some implementations use a session identifier to store data on the executing platform, but this information is session-specific, covering one agent's entire interaction with a system. It does not carry specific information about one instance of External Agent Interface generation.

Figure 5:
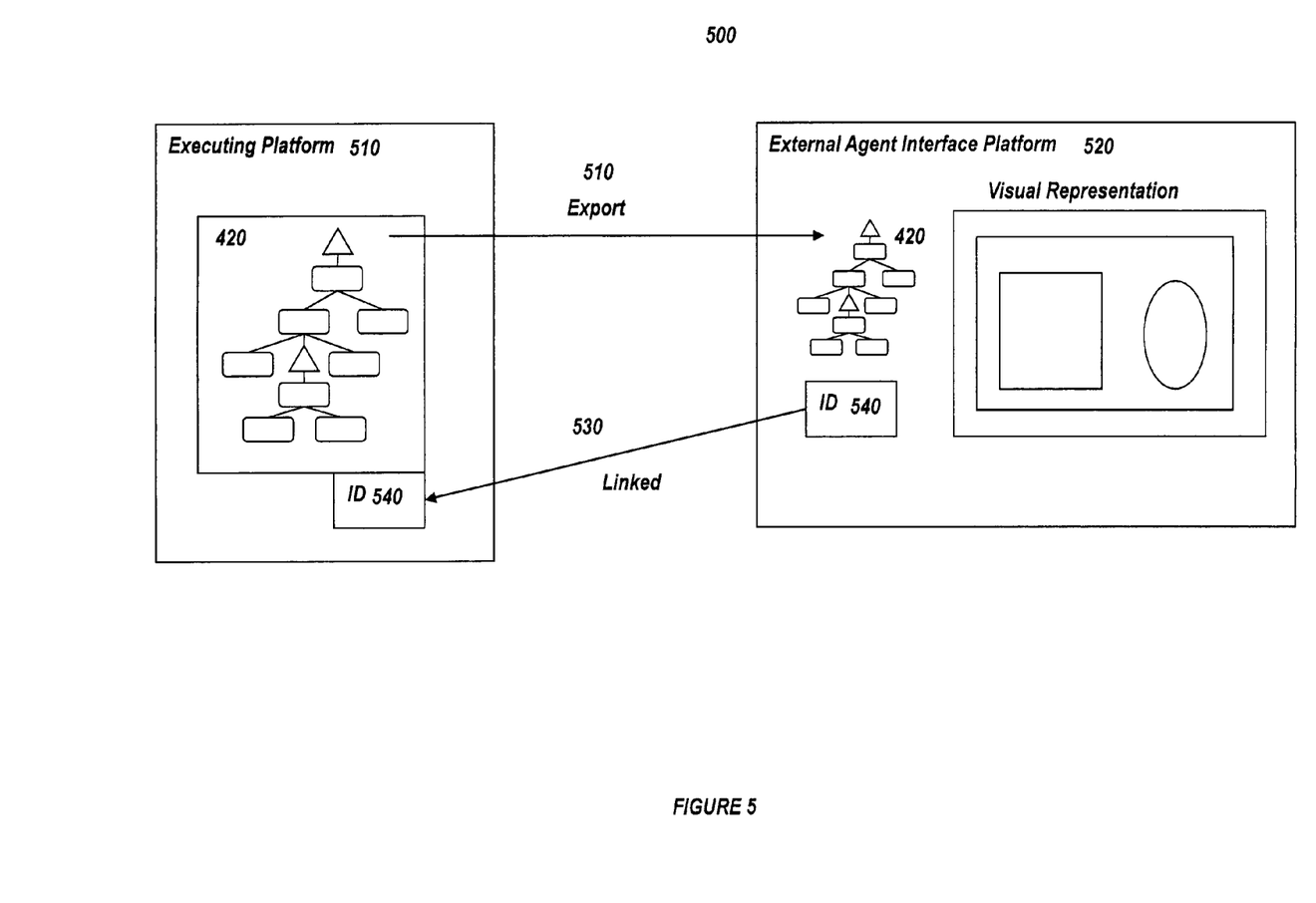
FIG. 5 illustrates methods of exporting of an External Agent Interface Element Hierarchy to an External Agent Interface Platform.

Referring to FIG. 5, methods 500 of exporting 510 of the EA Interface Element Hierarchy 420 to the EA Interface Platform 520 are illustrated. In FIG. 5, the technology maintains a link 530 to the specific process execution instance using a unique identifier 540.

In the following psuedocode example, the EA Interface Platform is a web browser. To export the EA Interface Element Hierarchy to a browser calls for both HTML for the presentation, and JavaScript for the behavior. In this example the exporting process expects the EA Interface Element to provide both HTML and Javascript as part of the export process.

```
interface InterfaceElement
    // functions for HTML export:
    // Create the HTML for this InterfaceElement
    function createHTML( ) returns String
    // Create the Javascript declaration for this
InterfaceElement
    function getJavascriptDeclaration( ) returns String
end interface
```

This object allows an EA Interface Element to add both HTML and JavaScript to the final representation in the browser. A psuedocode example of two Entity Elements using this system to export onto the browser follows.

```
structure InputInterfaceElement implements EntityElement
    String name
    constructor(String inputName)
        name := inputName
    end constructor
    // Create HTML for this input element
    function createHTML( ) returns String
        // Use the ID so we can retrieve it later
        return "<input id=\"" + name + "\" name=\"" + name +
```

-continued

```
            "\" type=\"submit\"/>
        end function
        // Javascript declaration
        function makeJavaScriptDeclaration( ) returns String
            return "new InputElement(" + name + ")"
        end function
    end structure
    structure GroupInterfaceElement implements EntityElement
        InterfaceElement[ ] children
        constructor(InterfaceElement[ ] childElements)
            children = childElements
        end constructor
        function createHTML( ) returns String
            String result := "<div>"
            // Recurse on each child
            for each child in children
                result := result + child.createHTML( )
            next child
            // finish our div tag
            result := "</div>"
            return result
        end function
        function getJavascriptDeclaration( ) returns String
            // A Javascript declaration of a browser object
            return "new GroupJavascriptObject( )"
        end function
    end structure
    structure DatasetDataElement implements DataElement
        dataset = data
        constructor(Dataset data)
            dataset = data
        end constructor
        function createHTML( ) returns String
            // Return all the childrens HTML, but contribute none
ourselves
            String result
            for each child in children
                result := result + child.createHTML( )
            next child
            return result
        end function
        function getJavascriptDeclaration( ) returns String
            // Return a declaration for a data entity that
includes the declaration
            // of the contained dataset
            return new "DatasetDataObject(" +
dataset.getJavascriptDeclaration( ) + ")"
        end function
    end structure
```

The mechanism of exporting the EA Interface Element Hierarchy on the external platform can be implemented in the following way. When process execution reaches the point of generating the exported EA Interface Hierarchy, the Executing Pystem will store an identifier of the specific execution instance and EA Interface Hierarchy creating this interface. For example:

```
... process is being executed ...
    PreparedElement preparedHierachy :=
retrievePreparedElementHierarchy("enter-details")
    // Create the Execution state
    ExecutionState executionState = createCurrentExecutionState( )
    // Create the interface entity hierachy - this call will result
in the recursive call
    // to each of the elements
    InterfaceElement interfaceHierarchy =
preparedHierarchy.createInterfaceElement(executionState)
    // Create the exported HTML and Javascript, making use of the
execution state
    writeHTMLPage(interfaceHierarchy, executionState)
```

The Executing Platform that created the EA Interface Hierarchy can form the final exported definition by calling a function that can construct the HTML page from the EA Interface Hierarchy, and also store a reference to the unique identifier of process execution, thus linking the EA Interface implementation with the specific instance of execution that created it, as in the following psuedocode example.

```
function writeHTMLPage(InterfaceElement interfaceHierarchy,
            ExecutionState
currentExecutionState)
        // Create a representation in the browser of the hiearchy,
by forming
        // a tree of the Javascript Declarations in the element
hierarchy
        String treeDeclaration :=
makeElementJSTree(interfaceHierarchy)
        // Create a unique identifier for the current process
execution and current interface hierarchy
        // This ID uniquely defines this instance of process
execution and this interface hierarchy
        String executionStateID =
storeExecutionStateAndInterfaceHierarchy(currentExecutionState,
interfaceHierarchy)
        // Create representations of all the data current available
to execution
        String datasetDeclaration := "var datasetMap = " +
makeCurrentDatasetJavascript(currentExecutionState) + ";\n"
        String valuesDeclaration := "var values = " +
makeDataValuesJavascript(currentExecutionState) + ";\n"
        // Add a reference to the stored ID into the page
        String executionIDDeclaration := "var executionID = " +
executionID + ";\n"
        // The complete Javascript for the page
        String treeJavascript := "var treeDeclaration = " +
treeDeclaration + ";\n"
        // Get the HTML from the hierarchy
        String hierarchyHTML := interfaceHierarchy.createHTML( )
        // Form the complete HTML
        String completeHTML =    "<html>
                    <head>
                        <!-- this for
any required includes for objects or types needed -->
                        <script
lang=\"javascript\" href=\"include.js\"/>
                        <script
lang=\"javascript\">"
                                +
datasetDeclaration
                                +
valuesDeclaration
                                +
executionIDDeclaration
                                +
treeJavascript
                        "</script>
                    </head>
                    <body
onload=\"startup\">"
                                +
hierarchyHTML +
                        "</body>
                </html>"
        sendPageToBrowser(completeHTML)
    end function
    // Returns a Javascript Object which is either
    // { entity: <the entity declaration>, children: [ <array of
child objects> ] }
    // or
    // { data: <the data element declaration>, children: [ <array of
child objects> ] }
    //
    // This function recurses on the children of the supplied element
to form the child
    // declarations
    function makeElementJSTree(InterfaceElement element)
        String result := "{ "
        if (element instanceof EntityElement)
            result := result + "entity: " +
element.getJavascriptDeclaration( )
        else if (element instanceof DataElement)
            result := result + "data: " +
element.getJavascriptDeclaration( )
```

-continued

```
        end
    // process children
    result := result ", [ "
    Boolean first = true
    for each element in element.getChildren( )
        if first
            first := false
        else
            result := result + ", "
        end if
        result := result + element.getJavascriptDeclaration( )
    next element
    return result
end function
```

This function can result in a translation of the EA Interface Hierarchy onto the EA Interface Platform something as the following.

```
{ entity: new GroupInterfaceElement( ),
    children: [ { entity: new InputInterfaceElement( ), children: [ ]
},
        { data: new QueryDataElement( ) , children: [ {
entity: new InputInterfaceElement( ), children: [ ] } ] } ] }
```

The result of this process is an EA Interface constructed by exporting a tree of EA Interface Elements onto the target platform, in the example case including a web browser. Along with the definition of the EA Interface, it includes a reference to the specific instance of process execution and the Prepared Element Hierarchy that generated it.

An Entity Element can require data arising from process execution in order to function correctly. For example in a visual interface an Entity Element can implement a graphical table. This table can display a list of data that was retrieved from an external system such as a database. The Entity Element can only access this data during execution as it may depend on other Execution State in order to make the query correctly. The implementation of an Entity Element can access and render this data as part of the implementation of the Entity Element on the EA Interface Platform. In the case of a web browser, JavaScript code can be executed to create the table dynamically.

Where data is required by the realization of the Entity Elements on the External Agent Interface Platform, access to that data can be controlled by the Data Elements contained in the EA Interface Element Hierarchy. Specifically, the realization of an Entity Element on the EA Interface Platform can request the data from the Data Element that is the nearest ancestor within the EA Interface Element Hierarchy. It can request data from the Data Element by referring to it by an identifier such as a textual value e.g. 'customer-data.'

In typical current systems that deal with data-bound EA Interface components, each component is responsible for retrieving, storing, and processing the data that it requires. Alternatively, custom code may be added to each individual EA Interface that connects an interface component with the data it requires. This ad hoc approach means that custom code must be written to make these connections and this work must be repeated on every EA Interface that is designed.

Adding an explicit channel through which EA Interface components retrieve their data has many benefits. The EA Interface component need only record the identifier that it uses to request the data rather than requiring code to retrieve the data manually. The Data Elements can therefore vary the manner in which data is retrieved without the Entity Element implementation changing. The Data Element can draw the required data from the Execution State prior to exporting to the EA Interface Platform. Also the Data Element can use the communication channel with the Executing Platform to retrieve data when requested.

Because the Entity Elements in the EA Interface Element Hierarchy can use different Data Elements to provide their data due to their position in the hierarchy, some groups of Entity Elements may access different sets of data from other groups. The two groups might not both have access to the same data. This ability to hide data from different parts of the External Agent Interface Element Hierarchy is beneficial because it reduces the complexity of the External Agent Interface implementation. This allows complex External Agent Interfaces to be constructed with less effort than in typical systems. Frameworks can be built that take advantage of this in order to provide developers with design tools for EA Interfaces.

Figure 6:
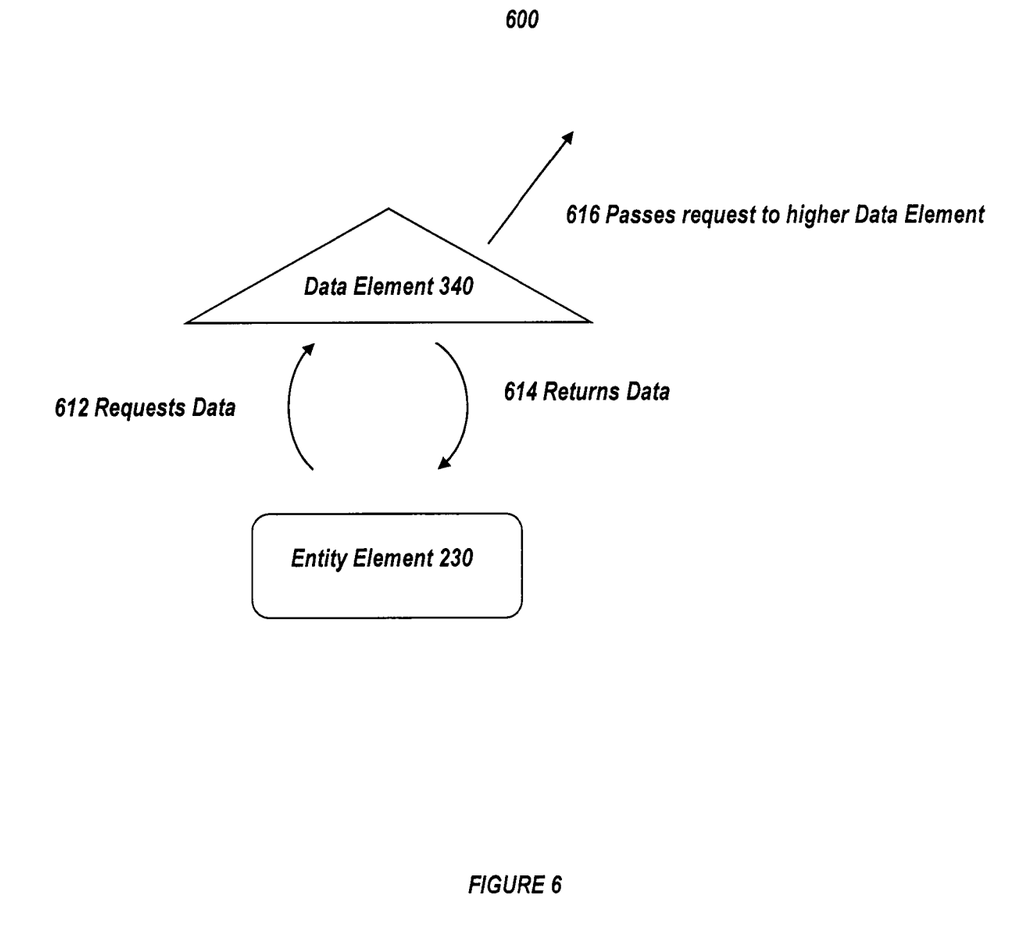
FIG. 6 illustrates methods of controlling of data access of an Entity Element through a Data Element.

Referring to FIG. 6, methods 600 of controlling of data access of an Entity Element 230 through a Data Element 340 is shown. The Data Element 340 is the nearest ancestor Data Element of the Entity Element 230. Requests for data 612 are either returned 614 from the Data Element 340 or the request is passed 616 to the next higher Data Element.

Elements within the exported EAI Element Hierarchy can make use of data in order to appear or behave correctly. To do this, the technology can provide each element within the interface tree with the means to retrieve data. An interface for providing data can be designed in accordance with the following psuedocode.

```
interface DataContext
    function findDataset(String name) returns Dataset
    function getValue(String key) returns String
end interface
```

A DataContext can be provided to each element in the hierarchy for the element to retrieve data from. One implementation of this can traverse the hierarchy, calling 'setDataContext' on each element with an implementation of the DataContext that can provide the corresponding data. A psuedocode example of the implementation of an Entity Element that uses this data follows.

```
// Javascript implementation of the Input entity element
var InputElement = function(name) {
    this.name = name;
}
InputElement.prototype = {
    setDataContext(dataContext) {
        this.dataContext = dataContext;
        var dataValue = dataContext.getValue(this.name);
        // set the input value to match
        document.getElementById(this.name) = dataValue;
    }
}
```

An implementation of a DataContext can be carried out in this way, for example.

```
var DataContextImpl = function(datasetMap, values, parentContext)
{
    this.datasetMap = datasetMap;
    this.values = values;
    this.parentContext = parentContext
}
```

```
DataContextImpl.prototype = {
    function findDataset(name) {
        if (this.datasetMap[name] != undefined) {
            return this.datasetMap[name];
        } else if (this.parentContext != null)
            return this.parentContext.findDataset(name);
        } else {
            return null;
        }
    }
    function getValue(String key) {
        if (this.values[key] != undefined) {
            return this.values[key];
        } else if (this.parentContext != null)
            return this.parentContext.getValue(key);
        } else {
            return null;
        }
    }
}
```

The providing of DataContext implementations to the entity elements can be carried out by the system in the following way, as an example.

```
// Use the top level datasetMap and values declaration to access
current
// execution data. No parent as we are the first
var topLevelDataContext = new DataContextImpl(datasetMap, values,
null);
// Go through the element tree, supplying the current data
context to each
// node in turn. If the node is a Data node, create a new
DataContext
// using that data entities datasets and values and move down the
tree
var setDataContextOnNode = function(node, currentDataContext) {
    var childContext;
    if (node.entity) {   // Its an entity type
        node.setDataContext(currentDataContext)
        childContext = currentDataContext
    } else if (node.data) {   // Its a data type
        // Form new data context from the data node, with
current as parent
        childContext = new DataContextImpl(node.datasets,
node.values, currentDataContext)
    }
    // recurse
    for (i = 0; i < node.children.length; i++) {
        setDataContextOnNode(node.children[i], childContext);
    }
}
// Start the assignment of data context from the root node
setDataContextOnNode(treeDeclaration, topLevelDataContext);
```

This can allow the technology to control the data visible to each node in the EAI Element Hierarchy depending on the location of that node within the hierarchy.

EA Interface implementations can initiate communication to retrieve data, and to initiate process execution on external systems. For example a EA Interface can make a query to a database based on search parameters provided by an agent, can instruct an external system to initiate a product order based on external input, and can initiate process execution on a platform other than the EA Interface Platform. In typical systems of this nature, the implementation of the EA Interface is responsible for initiating and processing this communication. The communication can be made with various external systems including the Executing Platform that generated the EA Interface.

Approaches other than the present technology provide little or no management of this external communication. Communication is made whenever the EA Interface needs to access external systems and there typically is no facility for centralized control of them. This makes it difficult to record the overall sequence of events that an agent initiated through the EA Interface. Many disparate systems may be involved in the communication and recording the order of these messages for a given agent can be difficult. If errors occur, then reproducing the sequence of events that caused the error to arise can be difficult.

Additionally, communication made to the Executing Platform typically is interpreted by the Executing Platform without detailed knowledge of the EA Interface that sent the message. Each message typically is interpreted as a new, independent communication and therefore the Executing Platform sends a general response that then typically requires custom code in the EA Interface in order to interpret the results and incorporate them into the EA Interface.

In implementations of the present technology, a link can be maintained between the implementation of the EA Interface Element Hierarchy on the EA Interface Platform and the Executing Platform that it originated from. This link can tie the EA Interface Element Hierarchy on the EA Interface Platform with the particular execution instance that created and exported it. This link can be achieved by assigning a unique identifier on the Executing Platform to the created EA Interface Element Hierarchy and the Execution State at that time. The Executing Platform then stores the EA Interface Element Hierarchy and Execution State in a manner that can be retrieved given the identifier. This can be stored in memory. It can be written to persistent storage such as a file system. The identifier then can be exported along with the EA Interface Element Hierarchy description to the EA Interface Platform. When communication is initiated between the EA Interface Platform and the Executing Platform, the EA Interface Platform can provide this identifier as part of the communication contents so that the Executing Platform can retrieve the EA Interface Element Hierarchy and Execution State referred to by that identifier before responding to the communication.

By maintaining a link between the specific instance of process execution that generated a EA Interface, it allows the record of that instance to hold data about the EA Interface generation that does not need to be exported to the EA Interface Platform. For example, some data is security sensitive and exporting it to an EA Interface Platform may constitute a security risk. However this data may be required for further execution, such as in the parameters of a query made to an external system such as a database. By maintaining this link, the Executing Platform can use this data in queries and provide the resulting data to the EA Interface Platform without having to disclose the sensitive data.

Systems without a link between Executing and EA Interface Platforms with regards to generation of an EA Interface typically provide additional data to the EA Interface Platform in a generalized way. If the EA Interface Platform requests data from the Executing Platform, it would be returned in a format that does not have any relation to the structure of the EA Interface Element Hierarchy on the EA Interface Platform. It may be textual data, or simple tabular data. This data must then be manipulated in the implementation of the EA Interface on the EA Interface Platform for it to be displayed there. When the Executing Platform has explicit knowledge about the EA Interface Element Hierarchy to which it is supplying data, it can tailor the returned data structure to align with that interface hierarchy. This is advantageous to developers of EA Interfaces as it relieves them of the burden of the manual manipulation of the EA Interface implementation on the EA Interface Platform. Frameworks can be built that allow EA Interfaces to be constructed without the developer having to write the interconnection code manually for each EA Interface.

As part of process execution on the Executing Platform, information relating to the EA Interface Element Hierarchy or the Execution State may change. For example the data in the Execution State may be altered. In these cases, the link between the EA Interface Platform and the Executing Platform can be updated to reflect the new state on the Executing Platform. In the case of a system where a unique identifier was used, the Executing System can update the information held against that identifier, and can supply the EA Interface Platform with a new unique identifier corresponding to the new information.

The link between the Interface and Executing Platforms may be used to provide agent interaction histories for a given application. Typical systems cannot easily record the sequence of events that an agent initiates through the EA Interface, at least in part due to the disconnected nature of the EA Interface from the Executing Platform and the lack of knowledge of the EA Interface on the part of the systems responding to communication originating from the interface platform. In implementations of the present technology, the link between the EA Interface Element Hierarchy on the EA Interface Platform and the specific instance of execution on the Executing Platform enables the Executing Platform to keep a detailed record of an agent's sequence of interactions with the EA Interface. It can allow the Executing Platform to record the sequence of interactions not only through the process execution on that platform, but also through the interactions of the agent through the EA Interface Platform. This information can be useful in areas such as error recording and reproduction and usage pattern analysis.

Figure 7:
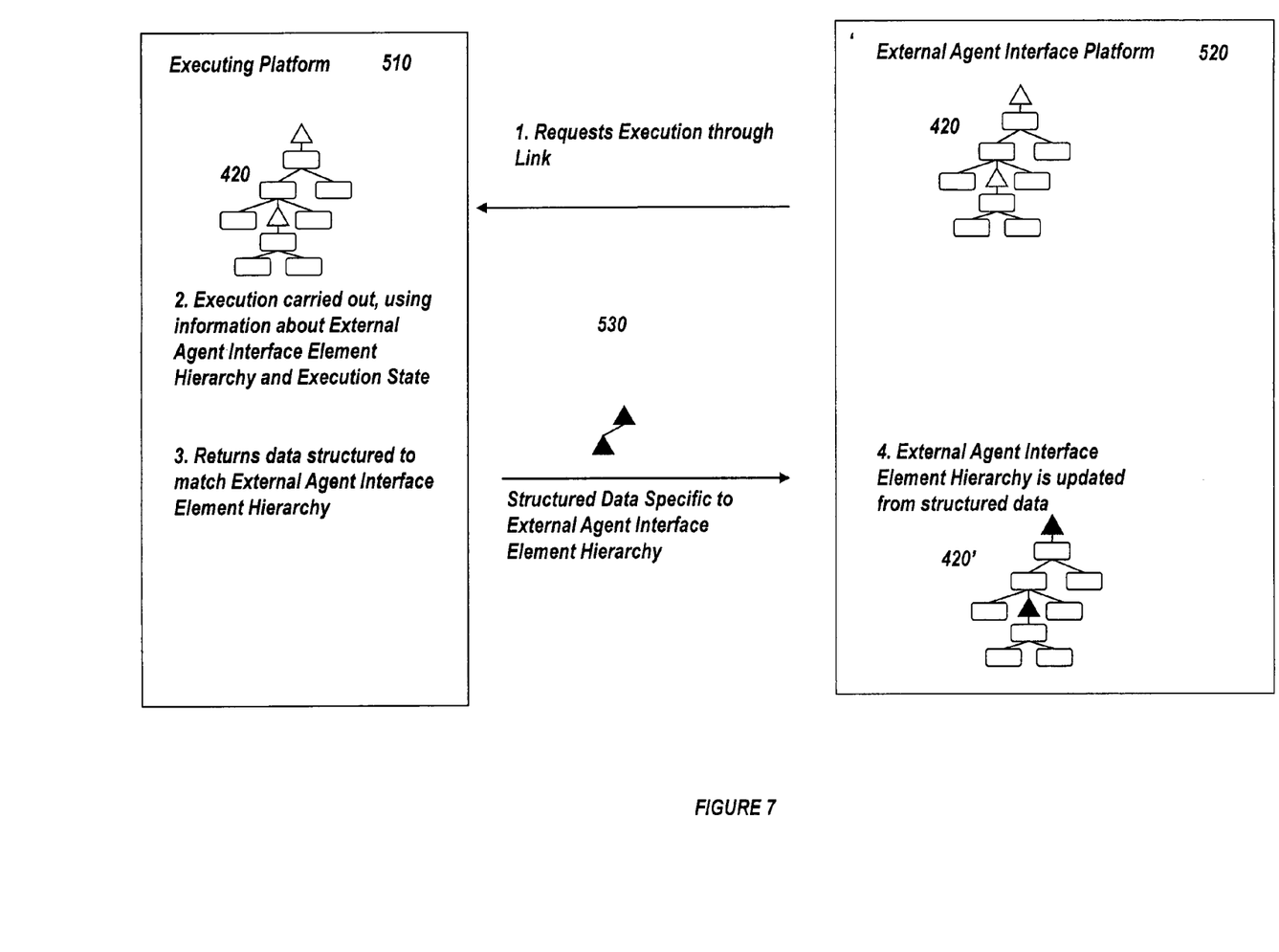
FIG. 7 is a block diagram illustrating operation of implementations of the technology.

Referring to FIG. 7, a block diagram 700 illustrating operation of implementations of the technology is shown. Communication between the EA Interface Platform 520 and Executing Platform 510 via the link 530 maintained to initiate further execution. The link 530 enables to the Executing Platform 510 to recall the EA Interface Element Hierarchy 420 that was exported to the EA Interface Platform 520 and the Execution State that existed at that time. The execution can result in data that the EA Interface Platform 520 integrates into a revised the EA Interface Element Hierarchy 420'.

When the EA Interface Platform (implementing a specific realization of the EA Interface) interacts with the software on the Execution Platform, it refers to the unique ID created for the specific realization and EA Interface Element Hierarchy that created it. This allows the software on the Executing Platform to use the information stored against that ID when interpreting and responding to these interactions. For example, a browser user interface may communicate with the software on the Executing Platform via asynchronous http calls initiated in JavaScript. In a situation where the EA Interface realization on the EA Interface Platform needed to perform some action on the Execution Platform, the following can be implemented.

```
        // Create a representation of the changes made to each data
    node in the tree
        var dataUpdateString = makeDataUpdateString( )
        // Specified by, perhaps, the button clicked
        var actionName = "retrieve-customers"
        // Perform the asynchronous call, using the unique
    execution id
        // 'handleResponse' here is a function that will be called
    when the response is returned.
        makeAjaxCall(actionName, dataUpdateString, executionID,
    handleResponse)
```

The 'makeDataUpdateString' function can encode changes to top-level data and to data elements that have occurred on the interface platform. This can be achieved as in the following example.

```
function makeDataUpdateString( ) returns String
    String result := new String( )
    // top level datasets
    result := result + "(topLevel: " +
    makeDatasetUpdateString(datasetMap, dataValues) + ")"
    // For each element in the tree, any data nodes have their
    update strings attached
        addDataNodeUpdateStrings(result, treeDeclaration)
end function
// This function checks the supplied node an if it is a
DataElement type,
// appends the update string for the supplied node onto the
'result' parameter
// in the format: "( <nodeid>: <update string> )" where <nodeid>
is the unique id of the
// data node, and <update string> is a string encoding any
changes made to the data in that
// node on the interface platform.
// If the node is not a DataElement, the 'result' parameter is
unchanged
// This function then recurses on each child of the supplied node
function addDataNodeUpdateStrings(String result, InterfaceElement
node)
    .. implementation ommitted ..
end function
```

On the Executing Platform, this request can be interpreted in function such as in the following example.

```
function handleAjaxCall(String actionName, String
dataUpdateString, String executionID) returns String
    // Retrieve the specific instance of Execution State and
Interface Hierarchy
        ExecutionState retrievedState
        InterfaceElement tree
        // Retrieve the execution state and interface element
        Pair storedDataa
    retrieveExecutionStateAndInterfaceElement(executionID)
        ExecutionState retrievedState = storedData.first
        InterfaceElement interfaceHierarchy = storedData.second
        // Update the execution state and data elements with the
    information sent from the interface platform
        mergeDataUpdates(dataUpdateString, retrievedState,
    interfaceHierarchy)
        // Perform the desired action
        performAction(actionName, retrievedState,
    interfaceHierarchy)
        // Store the state again as it may have changed
        String newExecutionID =
    storeExecutionStateAndInterfaceHierarchy(retrievedState,
    interfaceHierarchy)
        // return a representation of the new state, and the ID the
    persisted information
        return makeReturnString(retrievedState, interfaceHierarchy,
    newExecutionID)
end function
```

In the above function, the 'mergeDataUpdates' function uses the information in the update string to update the Execution State and the data elements to match the state of the EA Interface Platform. This can be achieved as follows:

```
function mergeDataUpdates(dataUpdateString, retrievedState,
interfaceHierarchy)
    // Split the string up by the ( ) groups to get the update
information
    UpdateInfo[ ] allUpdateInfo = parseString(dataUpdateString)
    for each updateInfo in allUpdateInfo
        if updateInfo.id = "toplevel"
```

```
      mergeChangesIntoExecutionState(retrievedState,
updateInfo.datasetMap, updateInto.valuesMap)
        else
          DataElement referredElement =
findDataElementByID(interfaceHierarchy, updateInfo.id)
          referredElement.mergeChanges(updateInfo.datasetMap,
updateInfo.valuesMap)
        end if
      next updateInfo
end function
```

The 'perform action' stage of the above mechanism can execute whatever Execution Platform process was associated with the named action. The Execution State supplied to this action can include the retrieved and updated Execution State from the originating process, and also can utilize data available through a Data Element within the EA Interface Hierarchy. This action can alter the data from these locations. The 'makeReturnString' function can create an encoding of the data changes made on the Executing Platform while carrying out this action. It can be constructed in a similar way as was performed on the EA Interface Platform prior to initiating this action. In addition to the encoded data changes, the Executing Platform can return the new ID of the stored Execution State and EA Interface Hierarchy. When the response is received by the EA Interface Platform, it can be processed in the following way:

```
function handleResponse(newExecutionID, dataUpdateString) {
    // Update the execution ID so that subsequent requests
    // use the updated state as persisted by the Executing
Platform
    executionID = newExecutionID;
    mergeDataUpdates(dataUpdateString)
}
```

Here the 'mergeDataUpdates' function can operate in a similar manner as the corresponding operation on the Executing Platform—it can update the top level dataset and data values and altered Data Elements if modifications are encoded in the dataUpdateString. In this manner both the Executing Platform and the EA Interface Platform can share information about each other. The EA Interface Platform can have an identifier that allows it to instruct the Executing Platform to interpret its communication in relation to a particular execution state and interface hierarchy. Conversely, the Executing Platform can retain knowledge of the interface hierarchy that is present on the Interface Platform, so the responding communication can be tailored to suit it.

The technology can take the forms of hardware, software or both hardware and software elements. In some implementations, the technology is implemented in software, which includes but is not limited to firmware, resident software, microcode, a Field Programmable Gate Array (FPGA) or Application-Specific Integrated Circuit (ASIC), etc. In particular, for real-time or near real-time use, an FPGA or ASIC implementation is desirable.

Furthermore, the present technology can take the form of a computer program product comprising program modules accessible from computer-usable or computer-readable medium storing program code for use by or in connection with one or more computers, processors, or instruction execution system. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium (though propagation mediums in and of themselves as signal carriers are not included in the definition of physical computer-readable medium). Examples of a physical computer-readable medium include a semiconductor or solid state memory, removable memory connected via USB, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD, and Blu Ray™. Both processors and program code for implementing each as aspect of the technology can be centralized or distributed (or a combination thereof) as known to those skilled in the art.

A data processing system suitable for storing a computer program product of the present technology and for executing the program code of the computer program product will include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters can also be coupled to the system to enable the data processing system to become coupled to other data processing systems or remote printers or storage devices through intervening private or public networks. Modems, cable modem, WiFi, and Ethernet cards are just a few of the currently available types of network adapters. Such systems can be centralized or distributed, e.g., in peer-to-peer and client/server configurations. In some implementations, the data processing system is implemented using one or both of FPGAs and ASICs.

The invention claimed is:

1. A stateful computer-implemented method for establishing an external agent interface on an external agent interface platform, the method comprising: defining, on an executing platform, a prepared element hierarchy on an executing platform as a function of at least an executing state of the executing platform; transforming, on an executing platform, the defined prepared element hierarchy into an external agent interface element hierarchy as a function of at least the execution state; and exporting, from the executing platform, the external agent interface element hierarchy to an external agent interface platform, and further comprising assigning an identifier to the combination of: exported external agent interface element hierarchy, and the execution state from which the exported external agent interface platform transformed the prepared element hierarchy into the exported external agent interface element hierarchy; wherein the exporting step happens more than once and wherein each time this happens the exported hierarchy is able to be different due to the execution state.

2. The computer-implemented method of claim 1, wherein: the external agent interface hierarchy comprising: at least one data element, and at least one entity element; and wherein each entity element accesses data only through at least one data element.

3. The computer-implemented method of claim 2, wherein: the data elements and the entity element are related in a hierarchy, each entity element has at least one data element through which the each entity element can access as an ancestor, and access of a given entity element to data is only through at least the nearest ancestor data element of the given entity element.

4. The computer-implemented method of claim 1, further comprising: realizing an external agent interface on the external agent interface platform based at least in part on the exported external agent interface element hierarchy; upon communication from the realized external agent interface to the executing platform; and on the executing platform assigning an identifier to the combination of: exported external agent interface element hierarchy, and the current execution state.

5. A system comprising: at least one processor, at least one non-transitory computer readable medium in communication with the processor; and at least one program module, stored on the at least one medium, and operable, upon execution by the processor for: defining, on an executing platform, a prepared element hierarchy on an executing platform as a function of at least an execution state of the executing platform; transforming, on an executing platform, the defined prepared element hierarchy into an external agent interface element hierarchy as a function of at least the execution state; and exporting, from the executing platform, the external agent interface element hierarchy to an external agent interface platform, and further comprising assigning an identifier to the combination of: exported external agent interface element hierarchy, and the execution state from which the exported external agent interface platform transformed the prepared element hierarchy into the exported external agent interface element hierarchy; wherein the exporting step happens more than once and wherein each time this happens the exported hierarchy is able to be different due to the execution state.

6. The system of claim 5, wherein: the external agent interface hierarchy comprises: at least one data element, and at least one entity element; and wherein each entity element accesses data only through at least one data element.

7. The system of claim 6, wherein: the data elements and the entity elements are related in a hierarchy, each entity element has at least one data element through which the each entity element can access as an ancestor, and access of a given entity element to data is only through at least the nearest ancestor data element of the given entity element.

8. The system of claim 5, further comprising: realizing an external agent interface on the external agent interface platform based at least in part on the exported external agent interface element hierarchy; upon communication from the realized external agent interface to the executing platform, communicating the assigned identifier to the executing platform; and on the execution platform assigning an identifier to the combination of: exported external agent interface element hierarchy, and the current execution state.

9. A computer program product comprising: at least one non-transitory computer readable medium; and at least one program module, stored on the at least one medium, and operable, upon execution by a processor for: defining, on an executing platform, a prepared element hierarchy on an executing platform as a function of at least an execution state of the executing platform; transforming, on an executing platform, the defined prepared element hierarchy into an external agent interface element hierarchy as a function of at least the execution state; and exporting, from the executing platform, the external agent interface element hierarchy to an external agent interface platform, and further comprising assigning an identifier to the combination of: exported external agent interface element hierarchy, and the execution state from which the exported external agent interface platform transformed the prepared element hierarchy into the exported external agent interface element hierarchy; wherein the exporting step happens more than once and wherein each time this happens the exported hierarchy is able to be different due to the execution state.

10. The computer program product of claim 9, wherein: the external agent interface hierarchy comprises: at least one data element, and at least one entity element; and wherein each entity element accesses data only through at least one data element.

11. The computer program product of claim 10, wherein: the data elements and the entity elements are related in a hierarchy, each entity element has at least one data element through which the each entity element can access as an ancestor, and access of a given entity element to data is only through at least the nearest ancestor data element of the given entity element.

12. The computer program product of claim 9, further comprising: realizing an external agent interface on the external agent interface platform based at least in part on the exported external agent interface element hierarchy; upon communication from the realized external agent interface to the executing platform, communicating the assigned identifier to the executing platform; and on the execution platform assigning an identifier to the combination of: exported external agent interface element hierarchy, and the current execution state.

\* \* \* \* \*